(12) United States Patent
Sumita

(10) Patent No.: US 8,738,371 B2
(45) Date of Patent: May 27, 2014

(54) USER INTERACTIVE APPARATUS AND METHOD, AND COMPUTER PROGRAM UTILIZING A DIRECTION DETECTOR WITH AN ELECTROMAGNETIC TRANSMITTER FOR DETECTING VIEWING DIRECTION OF A USER WEARING THE TRANSMITTER

(75) Inventor: Kazuo Sumita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1055 days.

(21) Appl. No.: 11/898,606

(22) Filed: Sep. 13, 2007

(65) Prior Publication Data

US 2008/0221877 A1 Sep. 11, 2008

(30) Foreign Application Priority Data

Mar. 5, 2007 (JP) ................................ 2007-054231

(51) Int. Cl.
| | | |
|---|---|---|
| G10L 21/00 | (2013.01) | |
| B25J 5/00 | (2006.01) | |
| G10L 21/04 | (2013.01) | |
| B62D 57/032 | (2006.01) | |
| G10L 19/02 | (2013.01) | |

(52) U.S. Cl.
CPC .............. G10L 21/04 (2013.01); B62D 57/032 (2013.01); *G10L 19/0212* (2013.01)
USPC ..................... 704/211; 318/568.12; 704/204

(58) Field of Classification Search
CPC ... G10L 21/04; G10L 19/0212; B62D 57/032
USPC ...................................... 704/211; 318/568.12
See application file for complete search history.

(56) References Cited

U.S. PATENT DOCUMENTS

| | | | |
|---|---|---|---|
| 6,567,723 B2 * | 5/2003 | Sugawara | 700/245 |
| 2003/0101219 A1 * | 5/2003 | Kondo et al. | 709/204 |
| 2004/0104702 A1 * | 6/2004 | Nakadai et al. | 318/568.12 |
| 2005/0080619 A1 * | 4/2005 | Choi et al. | 704/215 |
| 2008/0260175 A1 * | 10/2008 | Elko | 381/73.1 |

FOREIGN PATENT DOCUMENTS

| | | |
|---|---|---|
| JP | 2005-202076 | 7/2005 |
| JP | 3729918 | 10/2005 |

* cited by examiner

*Primary Examiner* — Farzad Kazeminezhad
(74) *Attorney, Agent, or Firm* — Finnegan, Henderson, Farabow, Garrett & Dunner, L.L.P.

(57) ABSTRACT

A response storage unit stores a response, a watching degree relative to a display unit, and an output form of the response to a speaker and the display unit. An extracting unit extracts a request from a speech recognition result. A response determining unit determines a response based on the extracted request. A direction detector detects a viewing direction based on sensing information received from a transmitter mounted on a user. A watching-degree determining unit determines a watching degree based on the viewing direction. An output controller obtains an output form corresponding to the response and the determined watching degree from the response storage unit, and outputs the response to the speaker and the display unit according to the obtained output form.

14 Claims, 15 Drawing Sheets

| INSTRUCTION EXPRESSION | INPUT COMMAND |
|---|---|
| REWIND | REWIND COMMAND |
| REPRODUCE FROM BEGINING | REWIND AND REPRODUCTION COMMAND |
| REWIND | REWIND COMMAND |
| REPRODUCE | REPRODUCTION COMMAND |
| : | : |

| QUERY EXPRESSION | QUERY TYPE |
|---|---|
| HOW MANY GRAMS | <quantity> |
| HOW | <how> |
| WHO | <person> |

FIG.8

| STATE | ACTION NAME | INPUT COMMAND | NEXT STATE |
|---|---|---|---|
| INITIAL STATE | BROADCAST PROGRAM PRESENTATION | PROGRAM LIST COMMAND | PROGRAM-LIST DISPLAY STATE |
| | | REPRODUCTION COMMAND | REPRODUCTION STATE |
| | | REWIND COMMAND | REWIND STATE |
| PROGRAM-LIST DISPLAY STATE | PROGRAM LIST DISPLAY | CURSOR SHIFT KEY | PROGRAM-LIST DISPLAY STATE |
| | | RESERVATION COMMAND | PROGRAM-INFORMATION DISPLAY STATE |
| REWIND AND REPRODUCTION STATE | REWIND AND REPRODUCTION | φ | REPRODUCTION STATE |
| .. | .. | .. | .. |

| ACTION NAME | WATCHING DEGREE | | RESPONSE ACTION |
|---|---|---|---|
| PROGRAM LIST DISPLAY | HIGH | CLOSE/FACING | NORMAL DISPLAY OF 10 ITEMS |
| | | CLOSE/DIFFERENT DIRECTION | NORMAL DISPLAY OF 10 ITEMS AND SPEECH OUTPUT OF ONE ITEM |
| | | FAR/FACING | ENLARGED DISPLAY OF 5 ITEMS |
| | LOW | FAR/DIFFERENT DIRECTION | ENLARGED DISPLAY OF 5 ITEMS AND SPEECH OUTPUT OF ONE ITEM |
| REWIND AND REPRODUCTION | HIGH | CLOSE/FACING | REWIND UP TO SPECIFIED SPOT AND REPRODUCE |
| | | CLOSE/DIFFERENT DIRECTION | REWIND UP TO SPECIFIED SPOT, REPRODUCE, AND SPEECH OUTPUT OF SUMMARY |
| | | FAR/FACING | REWIND UP TO SPECIFIED SPOT, REPRODUCE, AND SPEECH OUTPUT OF SUMMARY |
| | LOW | FAR/DIFFERENT DIRECTION | REWIND UP TO SPECIFIED SPOT, REPRODUCE, AND SPEECH OUTPUT OF SUMMARY |
| QUERY RESPONSE OUTPUT | HIGH | CLOSE/FACING | NORMAL DISPLAY OF RESPONSE |
| | | CLOSE/DIFFERENT DIRECTION | NORMAL DISPLAY OF RESPONSE AND SPEECH OUTPUT |
| | | FAR/FACING | ENLARGED DISPLAY OF RESPONSE |
| | LOW | FAR/DIFFERENT DIRECTION | ENLARGED DISPLAY OF RESPONSE AND SPEECH OUTPUT |

FIG.11

| SPEECH RECOGNITION RESULT | CAPTION RECOGNITION RESULT |
|---|---|
| 00:05.000<br>TODAY'S GUEST IS SAYURI YAMAMOTO. THANK YOU FOR JOINING US.<br>⋮<br>03:08.102<br>IT'S THE SEASON OF NEW POTATOES.<br>03:10.000<br>TODAY, WE WILL INTRODUCE A DISH USING DELICIOUS NEW POTATOES.<br>03:10.011<br>WE WILL USE POTATOES, CARROTS, AND MINCED MEAT.<br>⋮<br>03:15.041<br>FIRST, CUT POTATOES LIKE THIS.<br>⋮<br>03:20.500<br>NEXT, CUT CARROTS INTO DICES.<br>⋮<br>04:20.500<br>ADD A SPOON OF SUGAR. | 03:08.500<br>NEW POTATOES<br><br>03:16.000<br>CUT INTO DICES<br><br>03:21.000<br>CUT INTO DICES<br><br>04:21.000<br>ADD A SPOON OF SUGAR |

FIG.12

| PROPER-EXPRESSION EXTRACTION RESULTS (SPEECH) | PROPER-EXPRESSION EXTRACTION RESULTS (CAPTION) |
|---|---|
| 00:05.000<br>TODAY'S GUEST IS <PERSON> SAYURI YAMAMOTO </PERSON>.<br>THANK YOU FOR JOINING US. | |
| 03:08.102<br>IT'S THE SEASON OF <FOOD> NEW POTATOES </FOOD>. | 03:08.500<br><FOOD> NEW POTATOES </FOOD> |
| 03:10.000<br>TODAY, WE WILL INTRODUCE A <FOOD> DISH </FOOD> USING DELICIOUS <FOOD> NEW POTATOES </FOOD>.<br>03:10.011<br>WE WILL USE <FOOD> POTATOES </FOOD>, <FOOD> CARROTS </FOOD>, AND <FOOD> MINCED MEAT </FOOD>. | |
| 03:15.041<br>FIRST, CUT <FOOD> POTATOES </FOOD> LIKE THIS. | 03:16.000<br>CUT INTO DICES |
| 03:20.500<br>NEXT, CUT <FOOD> CARROTS </FOOD> INTO DICES. | 03:21.000<br>CUT INTO DICES |
| 04:20.500<br>ADD <QUANTITY> A SPOON OF </QUANTITY> <FOOD> SUGAR </FOOD>. | 04:21.000<br>ADD <QUANTITY> A SPOON OF </QUANTITY> <FOOD> SUGAR </FOOD>. |

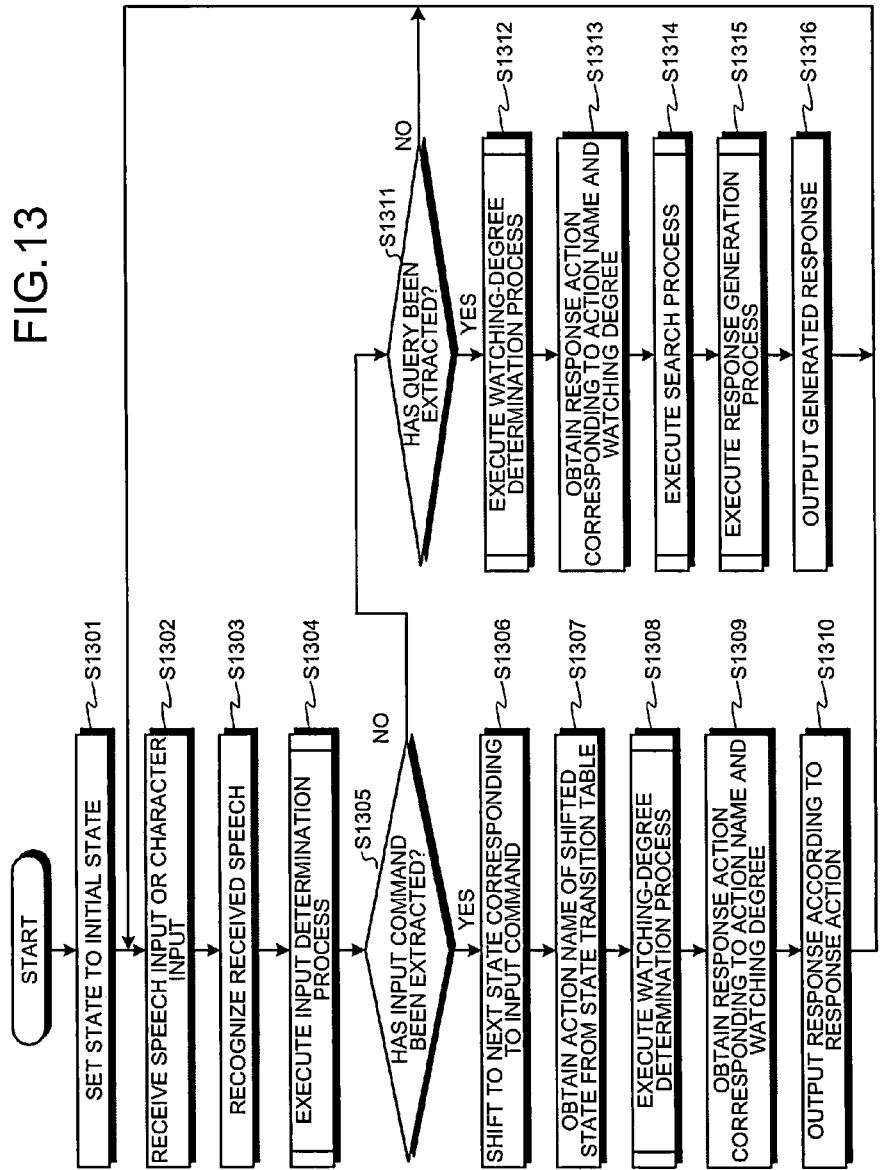

FIG.14

```
8 8/10 15:00-17:00 AFTERNOON INFORMATION PROGRAM
8 8/10 17:00-18:00 HIT THE ACE
8 8/10 18:00-19:00 EVENING NEWS
8 8/10 19:00-19:54 QUIZ PROGRAM
8 8/10 19:54-20:00 NEWS
8 8/10 20:00-20:54 POP MUSIC SHOW
8 8/10 20:54-21:00 NEWS
8 8/10 21:00-22:54 GOLDEN-TIME THEATER
8 8/10 22:54-23:00 SHORT STOP IN A TRIP
8 8/10 23:00-24:00 MIDNIGHT NEWS
```

FIG.15

```
8 8/10 15 AFTERNOON INFORMATION PROGRAM
8 8/10 17 HIT THE ACE
8 8/10 18 EVENING NEWS
8 8/10 19 QUIZ PROGRAM
8 8/10 20 POP MUSIC SHOW
```

USER INTERACTIVE APPARATUS AND METHOD, AND COMPUTER PROGRAM UTILIZING A DIRECTION DETECTOR WITH AN ELECTROMAGNETIC TRANSMITTER FOR DETECTING VIEWING DIRECTION OF A USER WEARING THE TRANSMITTER

CROSS-REFERENCE TO RELATED APPLICATIONS

This application is based upon and claims the benefit of priority from the prior Japanese Patent Application No. 2007-054231, filed on Mar. 5, 2007; the entire contents of which are incorporated herein by reference.

BACKGROUND OF THE INVENTION

1. Field of the Invention

The present invention relates to an interactive apparatus and a method for interacting with a user by a plurality of input/output units usable in combination, and a computer program product for executing the method.

2. Description of the Related Art

Recently, along with popularization of video recording-reproducing apparatuses such as a hard disk recorder and a multi-media personal computer, and with an increase in memory capacity of the video recording-reproducing apparatuses, there has been a new television-viewing style that many broadcast programs are recorded and a preferred program is viewed after completion of the program according to the user's preference.

Furthermore, digitalization of television broadcasting leads to an increase of the number of programs available to viewers, and along with an increase of the size of the memory capacity of video recording apparatuses, it can be time-consuming to search for only a program to be viewed, from a vast number of television programs recorded on the video recording apparatus.

Currently, as a human-machine interface of television and video recording-reproducing apparatuses, an interface using a remote controller for operating a ten key and a cursor key is generally used. For example, when recording of a television program is reserved or a recorded program is searched by using the remote controller, an item needs to be specified and selected one by one from a menu or a character list displayed on a television screen (hereinafter, "TV screen"). For example, when a keyword for program search is to be input, the keyword needs to be input by selecting a character one by one from the displayed character list, which is a time-consuming operation.

Further, televisions having an access function to the Internet have been already commercialized. With such televisions, a user can access and browse websites on the Internet via the television. Generally, this type of television also uses a remote controller as its interface. In this case, if the television is used only for browsing a website by clicking a link of the website, the operation is simple and there is no particular problem. However, when the keyword is input to search for a desired website, there is the same problem as that in the search of the television program.

Further, in an operation interface via the TV screen using a remote controller, it is assumed that a menu or the like is displayed on its TV screen, and therefore the operation cannot be performed from a remote place where the screen cannot be seen directly, or in a situation in which the user is busy with something.

For example, when it is assumed that the television is watched in a case that, while a recorded cooking program is being reproduced, cooking is performed according to the program, rewinding to a missed scene happens frequently according to need. However, there is a possibility that the user may not be able to release her hands during cooking or the hands may not be clean, and therefore the user cannot operate a remote controller by hand, or there can be a sanitary problem.

On the other hand, televisions having a function for recording a currently displayed program for a certain period of time and temporarily stopping the displayed program according to an instruction from a user by a remote controller or a function for rewinding to a necessary scene are also commercially available. When a user of this type of television is viewing a weather forecast in a busy time in the morning, the user can miss a scene of or fail to hear the forecast for a concerned local area, because the user cannot use the remote controller. Further, in a situation in which the user cannot release the hands, for example, due to changing clothes, the user may have to stop watching the screen because holding the remote controller to instruct rewinding is time-consuming.

To solve these problems, a human-machine interface based on speech input is desired rather than a general interface by a remote controller. Therefore, multimodal interface technology based on speech input has been studied. The multimodal interface technology enables electronic information equipment to be operated by speech, even when its user cannot use hands, by providing a speech recognition function to the electronic information equipment such as a television.

In the interface using the speech input, it is assumed that various instructions different for each user are input, as compared with a case that an operation is instructed by the remote controller from a menu or the like displayed fixedly. Therefore, it is required to realize natural interaction by recognizing the input speech accurately to return an appropriate response.

Japanese Patent No. 3729918 has proposed a technique for changing over output media corresponding to a situation of an interaction plan in a multimodal interactive apparatus. For example, in Japanese Patent No. 3729918, when speech recognition has failed resulting from an error in spoken sound due to user's misunderstanding or unregistered words, the multimodal interactive apparatus detects this problem, changes over to another medium such as pen input other than speech, to urge the user to input. Accordingly, interruption of interaction can be avoided and smooth interaction can be realized.

JP-A 2005-202076 (KOKAI) discloses a technique for smoothing interaction according to a distance between a user and a system. Specifically, in JP-A 2005-202076 (KOKAI), a smoothing technique of interaction is proposed, in which, when there is a considerable distance between a robot and a user, the volume of speech of the robot is increased, because there is a high possibility that the speech of the robot cannot be heard by the user.

However, according to the methods disclosed in Japanese Patent No. 3729918 and JP-A 2005-202076 (KOKAI), because it is not taken into consideration whether the user is watching the apparatus to be operated, there is a problem that there can be a case that an appropriate response cannot be returned to the user.

For example, when the user instructs a video recording apparatus to rewind, if the user is watching the TV screen, the user can understand the program content including images and speech by directly reproducing the program after completion of rewind. However, because the television program is produced relative to viewers who watch the TV screen, if the user is present where the TV screen cannot be seen, the user may not be able to understand the program content only by presenting the program as it is.

For example, it is assumed that there is a scene of cutting potatoes in a cooking program, and the user has missed the scene and asks a question, "how should I cut the potatoes", to a system. In this scene, there is a possibility that only images are projected without giving any particular oral explanations, and a caption "Cut it into dices" is presented. In this case, if the user is watching the TV screen carefully, only, presenting the scene of cutting potatoes by images is sufficient. However, because there is no oral explanation, if the user is not watching the TV screen carefully, only reproduction of the scene is not sufficient as the response to the question.

Particularly, when the speech input is used as the interface, there is a high possibility of occurrence of the above problems, because it is considered that the user frequently inputs an operation instruction without watching the TV screen carefully.

SUMMARY OF THE INVENTION

According to one aspect of the present invention, an interactive apparatus includes a recognizing unit configured to recognize speech uttered by a user; an extracting unit configured to extract a request from the speech; a response determining unit configured to determine a response to the request; a display unit configured to display the response; a speech output unit configured to output the response by speech; a response storage unit configured to store a response correspondence table that contains the response, a watching degree representing a degree that the user watches the display unit, and an output form of the response to at least one of the speech output unit and the display unit; a direction detector configured to detect a viewing direction of the user; a watching-degree determining unit configured to determine the watching degree based on the viewing direction; and an output controller configured to obtain the output form corresponding to the response determined by the response determining unit and the watching degree determined by the watching-degree determining unit from the response correspondence table, and to output the response to at least one of the speech output unit and the display unit according to the obtained output form.

According to another aspect of the present invention, a method for interacting with a user includes recognizing speech uttered by a user; extracting a request from the speech; determining a response to the request; detecting a viewing direction of the user; determining a watching degree representing a degree that the user watches a display unit capable of displaying the response to the request, based on the viewing direction; obtaining the output form corresponding to the determined response and the determined watching degree from a response correspondence table stored in a response storage unit, the response correspondence table containing the response, the watching degree, and an output form of the response to at least one of a speech output unit capable of outputting the response in speech and the display unit; and outputting the response to at least one of the speech output unit and the display unit according to the obtained output form.

A computer program product according to still another aspect of the present invention causes a computer to perform the method according to the present invention.

BRIEF DESCRIPTION OF THE DRAWINGS

FIG. 8 is a schematic diagram for explaining one example of a data structure of a state transition table stored in a state-transition storage unit;

FIG. 9 is a schematic diagram for explaining one example of a data structure of a response correspondence table stored in a response storage unit;

FIG. 11 is a schematic diagram for explaining one example of recognition results obtained by a continuous-speech recognizing unit and a caption recognizing unit;

FIG. 12 is a schematic diagram for explaining one example of an index;

FIG. 13 is a flowchart of an overall flow of the interactive process in the embodiment;

FIG. 14 is a schematic diagram for explaining one example of a program-list display screen in a case of normal display;

FIG. 15 is a schematic diagram for explaining one example of a program-list display screen in a case of enlarged display;

DETAILED DESCRIPTION OF THE INVENTION

Exemplary embodiments of an interactive apparatus and a method for interacting with a user, and a computer program product for executing the method according to the present invention will be explained below in detail with reference to the accompanying drawings.

An interactive apparatus according to an embodiment of the present invention presents a response content and type to the user by changing the response content and type according to a watching state determined by a viewing direction of the user and a distance to the user. An example in which the interactive apparatus is realized as a video recording-reproducing apparatus capable of recording and reproducing recorded broadcast programs, such as the hard disk recorder and the multi-media personal computer is explained below.

Figure 1:
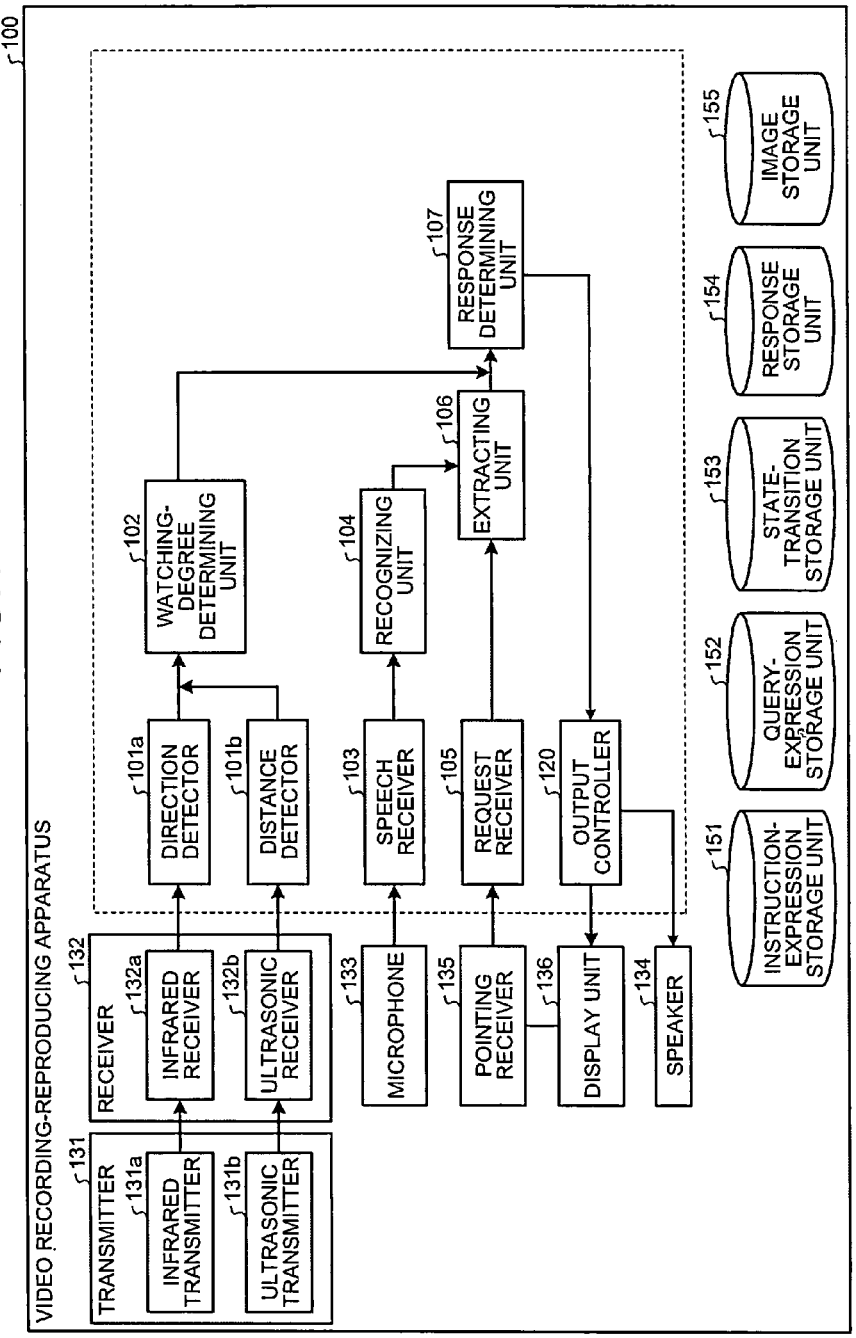
FIG. 1 is a block diagram of a configuration of a video recording-reproducing apparatus according to an embodiment of the present invention.

As shown in FIG. 1, a video recording-reproducing apparatus 100 includes, as a main hardware configuration, a transmitter 131, a receiver 132, a microphone 133, a speaker 134, a pointing receiver 135, a display unit 136, an instruction-expression storage unit 151, a query-expression storage unit 152, a state-transition storage unit 153, a response storage unit 154, and an image storage unit 155.

The video recording-reproducing apparatus 100 also includes, as a main software configuration, a direction detector 101a, a distance detector 101b, a watching-degree determining unit 102, a speech receiver 103, a recognizing unit 104, a request receiver 105, an extracting unit 106, a response determining unit 107, and an output controller 120.

The transmitter 131 transmits sensing information for detecting any one of the watching direction of the user and the distance to the user or both. The sensing information stands for information that can be detected by a predetermined detector using, for example, electromagnetic waves such as infrared rays or sound waves. According to the embodiment, the transmitter 131 includes an infrared transmitter 131a and an ultrasonic transmitter 131b.

The infrared transmitter 131a emits infrared rays having directivity to detect the watching direction of the user. The infrared transmitter 131a is provided, for example, on an upper part of a headset worn by the user, so that the infrared rays are irradiated toward the viewing direction of the user. The configuration of the headset will be explained later in detail.

The ultrasonic transmitter 131b transmits ultrasonic waves for measuring a distance. Distance measurement by the ultrasonic waves is a technique generally used by a distance measuring apparatus placed on the market. In the distance measurement by the ultrasonic waves, an ultrasonic pulse is transmitted by an ultrasonic transducer, which is then received by an ultrasonic sensor. Because the ultrasonic waves propagate in the air at a sound speed, it takes time until the ultrasonic pulse is transmitted. By measuring this time, the distance is measured. In the distance measurement by the ultrasonic waves, generally, the ultrasonic transducer and the ultrasonic sensor are built in the measuring apparatus beforehand, ultrasonic waves are emitted toward an object (a wall or the like), distance from which is to be measured, and a reflected wave is received to measure the distance.

In the present embodiment, the ultrasonic transducer is used for the ultrasonic transmitter 131b and the ultrasonic sensor is used for an ultrasonic receiver 132b. That is, the ultrasonic transmitter 131b transmits the ultrasonic pulse, and the ultrasonic receiver 132b receives the ultrasonic pulse. Because the ultrasonic waves propagate in the air at a sound speed, the distance can be measured by a time difference for transmitting the ultrasonic pulse.

The receiver 132 receives the sensing information transmitted from the transmitter 131, and includes an infrared receiver 132a and the ultrasonic receiver 132b.

The infrared receiver 132a receives infrared rays transmitted by the infrared transmitter 131a, and is provided, for example, below the display unit 136. The infrared transmitter 131a and the infrared receiver 132a can be realized by the same configuration generally used as a remote controller and a reader of various types of electronic equipment.

The ultrasonic receiver 132b receives the ultrasonic waves transmitted by the ultrasonic transmitter 131b, and provided, for example, below the display unit 136 as with the infrared receiver 132a.

A method of detecting the viewing direction and the distance is not limited to the methods using the infrared rays and the ultrasonic waves. Any conventionally used methods can be employed, such as a method of measuring the distance by the infrared rays, and a method of determining a distance between the user and the display unit 136 and whether the user faces the display unit 136, by using image recognition processing for recognizing a face image taken by an imaging unit.

The microphone 133 inputs speech uttered by the user. The speaker 134 converts (DA converts) a digital speech signal such as a speech obtained by synthesizing responses to an analog speech signal and outputs the analog speech signal. In the present embodiment, a headset including the microphone 133 and the speaker 134 integrally formed is used.

Figure 2:
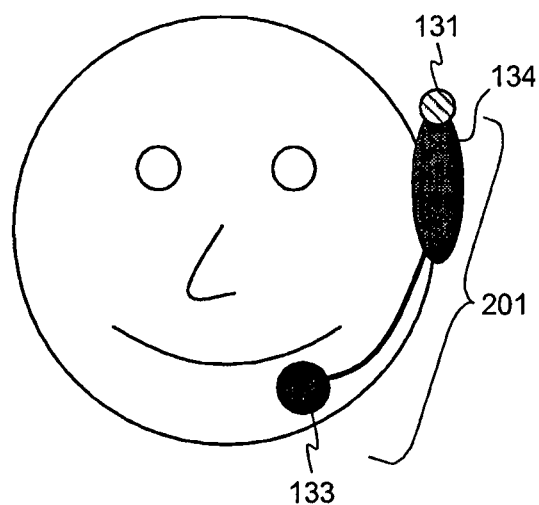
FIG. 2 is a schematic diagram for explaining a configuration example of a headset.
Figure 3:
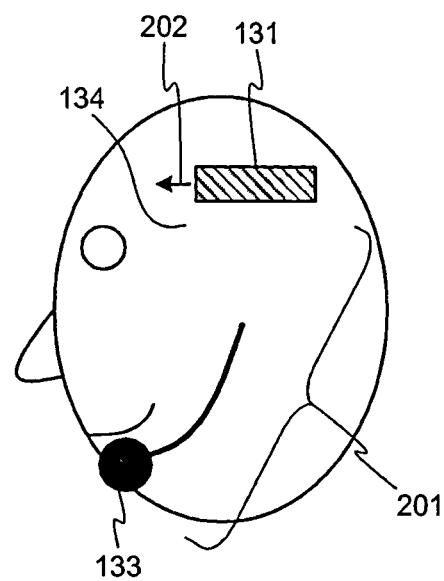
FIG. 3 is another schematic diagram for explaining a configuration example of the headset.

FIG. 2 depicts a case that the headset worn by the user is seen from the front of the user. FIG. 3 depicts a case that the headset is seen from the side of the user.

As shown in FIGS. 2 and 3, a headset 201 includes the microphone 133 and the speaker 134. The transmitter 131 is arranged above the speaker 134. Speech input/output signals can be transferred between the headset and the video recording-reproducing apparatus 100 by using a connection means such as the Bluetooth wireless or wired technology. As shown in FIG. 3, the infrared or ultrasonic sensing information is transmitted in a front direction 202 of the user.

Figures 4, 5, 6:
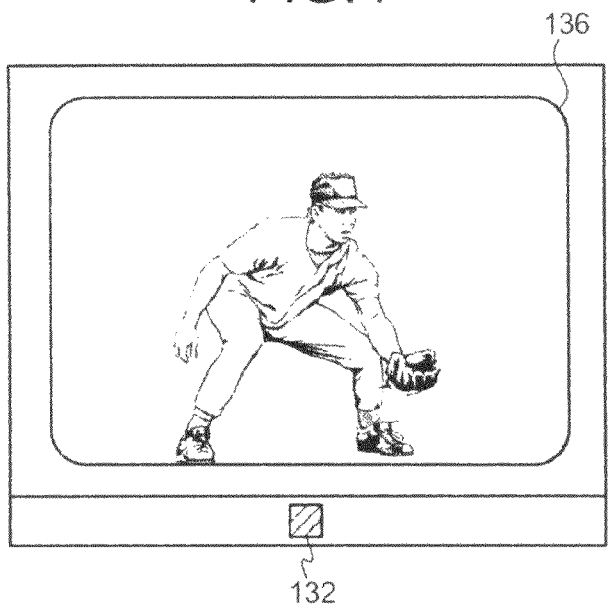
FIG. 4 is a schematic diagram for explaining a configuration example of a receiver.
FIG. 5 is a schematic diagram for explaining one example of a data structure of an instruction expression table stored in an instruction-expression storage unit.
FIG. 6 is a schematic diagram for explaining one example of a data structure of a query expression table stored in a query-expression storage unit.

A configuration example of the receiver 132 is explained. As shown in FIG. 4, the receiver 132 is incorporated below the display unit 136 so that the sensing information transmitted from the front direction of the display unit 136 can be received.

An infrared-ray emitting function is incorporated in the transmitter 131 of the headset 201, and an infrared-ray receiving function is incorporated in the receiver 132 arranged below the display unit 136. It is determined whether the infrared rays emitted from the transmitter 131 can be received by the receiver 132, thereby enabling detection at least whether the user faces the display unit 136 or faces another direction from which the display unit 136 cannot be seen.

Any generally used microphone such as a pin microphone can be used instead of the microphone 133 equipped on the headset 201.

The pointing receiver 135 receives a pointing instruction transmitted by the pointing device having a pointing function such as the remote controller using the infrared rays. Accordingly, the user can instruct a desired menu from menus displayed on the display unit 136.

The display unit 136 presents the menu, reproduced image information, and responses thereon, and can be realized by any conventionally used display unit such as a liquid crystal display, a cathode-ray tube, and a plasma display.

The instruction-expression storage unit 151 stores an instruction expression table for extracting an instruction expression corresponding to an operation instruction such as a command from a recognition result of speech input by the user or an input character.

As shown in FIG. 5, in the instruction expression table, an instruction expression to be extracted from character strings as the speech recognition result output by the recognizing unit 104 and a character string output by the request receiver 105, and an input command corresponding to the instruction expression are stored in association with each other in a table format. In FIG. 5, an example in which "rewind" and "rewind command" are stored as an instruction expression corresponding to a rewind command for instructing rewind is shown.

The query-expression storage unit 152 stores a query expression table for extracting a query expression corresponding to a query from a recognition result of speech input by the user.

As shown in FIG. 6, in the query expression table, a query expression to be extracted and a query type representing a type of the query are stored in association with each other. In FIG. 6, such an example is shown that an expression of "how many grams" is a query expression representing a query, and the query type is "<quantity>" representing that the query is asking a quantity.

The state-transition storage unit 153 stores a state transition table in which states generated by interaction and a transition relationship between the states are specified. The response determining unit 107 refers to the state-transition storage unit 153 to manage the interactive state to perform state transition, to determine an appropriate response.

Figure 7:
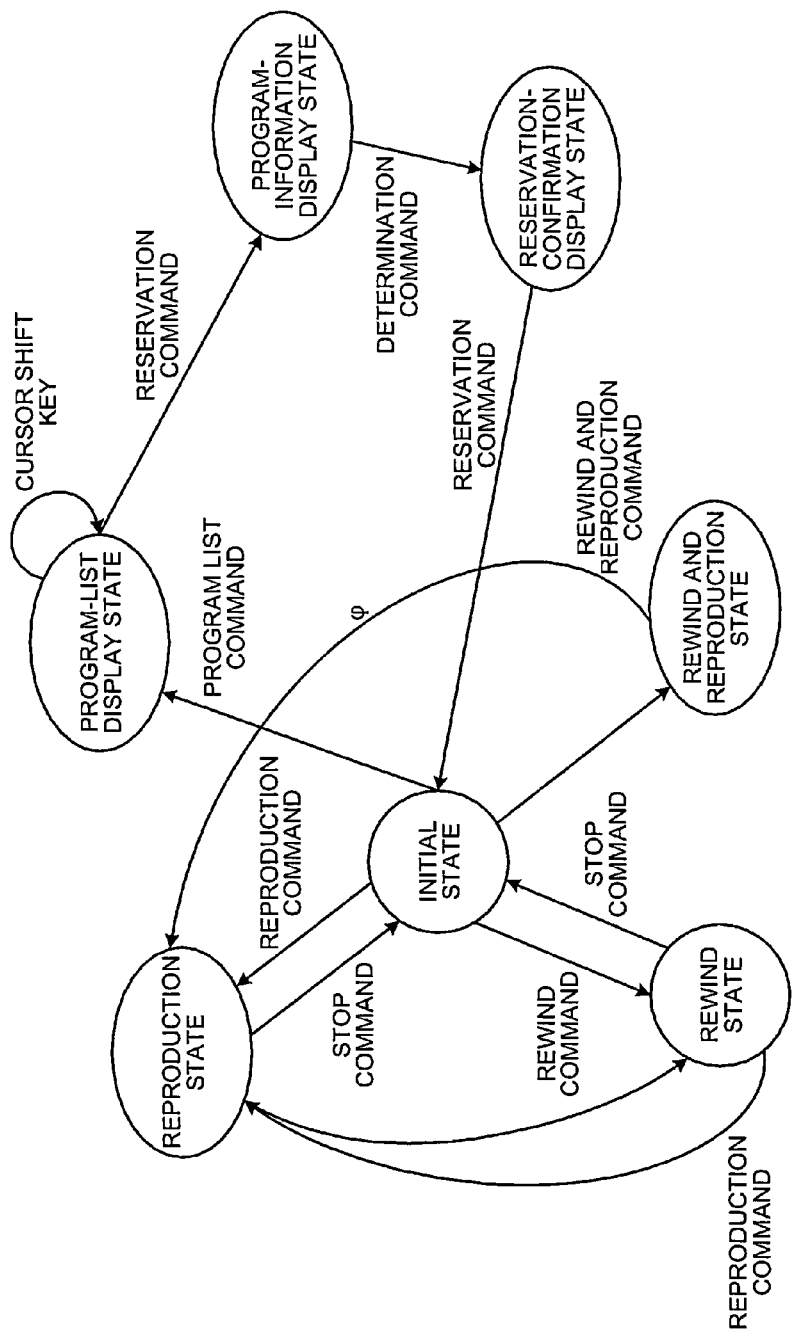
FIG. 7 is a schematic diagram for explaining one example of a state transition occurring in an interactive process by the video recording-reproducing apparatus according to the embodiment.

An example of the transition relationship between the states is explained. In FIG. 7, an ellipse expresses each state, and an arc connecting the ellipses expresses the transition relationship between the states. A character string added to each arc expresses a corresponding command, and transition to the corresponding state is performed by inputting the command.

For example, in FIG. 7, it is shown that when a reproduction command is input in an initial stage, the state changes to a reproduction state. Further, it is shown that when a stop command is input in the reproduction state, the state changes to the initial state. "φ" expresses that, when the stop command is input in the reproduction state, the state automatically changes. That is, for example, it is shown that from a rewind and reproduction state, the state changes to the reproduction state after a certain time has passed.

For example, a button for performing reproduction after rewinding for a certain time is provided as a button on the remote controller, a rewind and reproduction command is input by pressing this button. When a command by speech is received, for example, uttered sound "rewind for xxx seconds" can be interpreted as the rewind and reproduction command, instructing to reproduce after performing a rewinding process for specified seconds. That is, interpretation is performed according to the current state such that if "rewind for xxx seconds" is uttered while performing reproduction, it is interpreted as the rewind and reproduction command, and if "rewind for xxx seconds" is uttered while being under suspension, it is interpreted as a rewind command. In this case, the instruction-expression storage unit 151 can be realized by storing information associating the instruction expression and input command in the table shown in FIG. 5 with each of the current state.

As shown in FIG. 8, in the state transition table, state, action name expressing a name of a process to be executed at the time of shifting to the state, input command that can be input in the state, and next state expressing the state to be shifted corresponding to the input command are stored in association with each other. In the state transition diagram in FIG. 7, "input command" corresponds to the command added to each arc, and "next state" corresponds to the state to be shifted, which is present at a destination of the arc.

The response storage unit 154 stores a response correspondence table in which a response action representing a process content to be actually executed according to a watching degree is stored for each response to be executed. The watching degree is information representing a degree that the user watches the display unit 136, and is determined by the watching-degree determining unit 102.

As shown in FIG. 9, in the response correspondence table, action name, watching degree, and response action are stored in association with each other. In the present embodiment, four-level watching degrees, that is, "close/facing", "close/different direction", "far/facing", and "far/different direction" are used in a decreasing order of watching degree.

Details of a watching-degree determination method and details of the response action will be explained later.

The instruction-expression storage unit 151, the query-expression storage unit 152, the state-transition storage unit 153, and the response storage unit 154 can be formed by any generally used recording medium such as a hard disk drive (HDD), an optical disk, a memory card, and a random access memory (RAM).

The image storage unit 155 stores image contents to be reproduced. For example, when the video recording-reproducing apparatus 100 is realized as a hard disk recorder, the image storage unit 155 can be formed by the HDD. The image storage unit 155 is not limited to the HDD, and can be formed by any recording medium such as a digital versatile disk (DVD).

The direction detector 101a detects a viewing direction of the user by infrared rays received by the infrared receiver 132a. Specifically, when infrared rays are received by the infrared receiver 132a, the direction detector 101a detects that the viewing direction faces the display unit 136.

The distance detector 101b detects the distance to the user by the ultrasonic waves received by the ultrasonic receiver 132b. Specifically, the distance detector 101b detects the distance to the user by measuring the time since transmission of the ultrasonic pulse from the ultrasonic transmitter 131b until the ultrasonic pulse is received by the ultrasonic receiver 132b.

The watching-degree determining unit 102 refers to detection results of the direction detector 101a and the distance detector 101b to determine the watching degree of the user relative to the display unit 136. In the present embodiment, the watching-degree determining unit 102 determines the four-level watching degree according to the viewing direction detected by the direction detector 101a and the distance detected by the distance detector 101b.

Specifically, the watching-degree determining unit 102 determines any one of the four watching degrees, that is, "close/facing" in which the distance is close and the viewing direction faces the display unit 136, "close/different direction" in which the distance is close but the viewing direction does not face the display unit 136, "far/facing" in which the distance is far and the viewing direction faces the display unit 136, and "far/different direction" in which the distance is far and the viewing direction does not face the display unit 136, in a descending order of the watching degree.

The watching-degree determining unit 102 determines that the distance is "close" when the distance detected by the distance detector 101b is smaller than a predetermined threshold value, and determines that the distance is "far" when the distance is larger than the threshold value. When the direction detector 101a detects that the viewing direction faces the direction toward the display unit 136, the watching-degree determining unit 102 determines that the viewing direction is "facing", and when the direction detector 101a does not detect that the viewing direction faces the direction toward the display unit 136, the watching-degree determining unit 102 determines that the viewing direction is "different direction".

The determination method of the watching degree is not limited to the above method, and any method can be used so long as the watching degree of the user relative to the display unit 136 can be expressed. For example, the watching degree can be determined according to the distance to the user, which is expressed not by two levels of "close" and "far", but by three or more levels based on two or more predetermined threshold values. When an angle between the viewing direction and a direction toward the display unit 136 can be detected in detail by a method using the image recognition processing or the like, a method of classifying the watching degree in detail according to the angle can be used.

The speech receiver 103 converts speech input from the microphone 133 to an electric signal (speech data), which is then analog-to-digital (A/D) converted to digital data according to a pulse code modulation (PCM) method or the like, and outputs the digital data. These processes can be realized by the same method as a digitalization process of the speech signal conventionally used.

The recognizing unit 104 executes the speech recognition process in which the speech signal output by the speech receiver 103 is converted to a character string, and a continuous speech-recognition process and an isolated-word speech-recognition process can be assumed. In the speech recognition process performed by the recognizing unit 104, any generally used speech recognition methods using, for example, LPC analysis and hidden Markov model (HMM) can be employed.

The request receiver 105 receives a request corresponding to the pointing instruction received by the pointing receiver 135 as a request selected by the user, from selectable requests such as menus and commands displayed on the display unit 136. The request receiver 105 can also receive a character string input by selecting characters from the character list displayed on the display unit 136 as the request.

The extracting unit 106 extracts a request such as a command or a query from a character string, which is a speech recognition result obtained by the recognizing unit 104, or a character string received by the request receiver 105. For example, if a speech recognition result of "reproduce from one minute before" is obtained from the uttered sound of the user, the extracting unit 106 extracts that it is a rewind and reproduction command and the rewind time is one minute.

The response determining unit 107 controls interaction for performing interactive state transition according to the command or query extracted by the extracting unit 106 and the menu or command received by the request receiver 105, and determines a response according to the transition state. Specifically, the response determining unit 107 determines a state to be shifted (the next state) by referring to the state transition table, and determines a process to be executed in the next state (an action name).

The output controller 120 determines a response action corresponding to the watching degree determined by the watching-degree determining unit 102, relative to the action name determined by the response determining unit 107. Specifically, the output controller 120 obtains the action name determined by the response determining unit 107 and the response action corresponding to the watching degree determined by the watching-degree determining unit 102, by referring to the response correspondence table.

The output controller 120 controls a process for outputting the response according to the determined response action. Because the present embodiment is an example in which the interactive apparatus is realized as the video recording-reproducing apparatus 100, the output controller 120 executes various processes including a process for generating image contents to be reproduced.

For example, when the interactive apparatus is realized as a car navigation system, the output controller 120 executes various processes required for car navigation, such as an image data generation process of a map to be displayed on a screen as a response.

Figure 10:
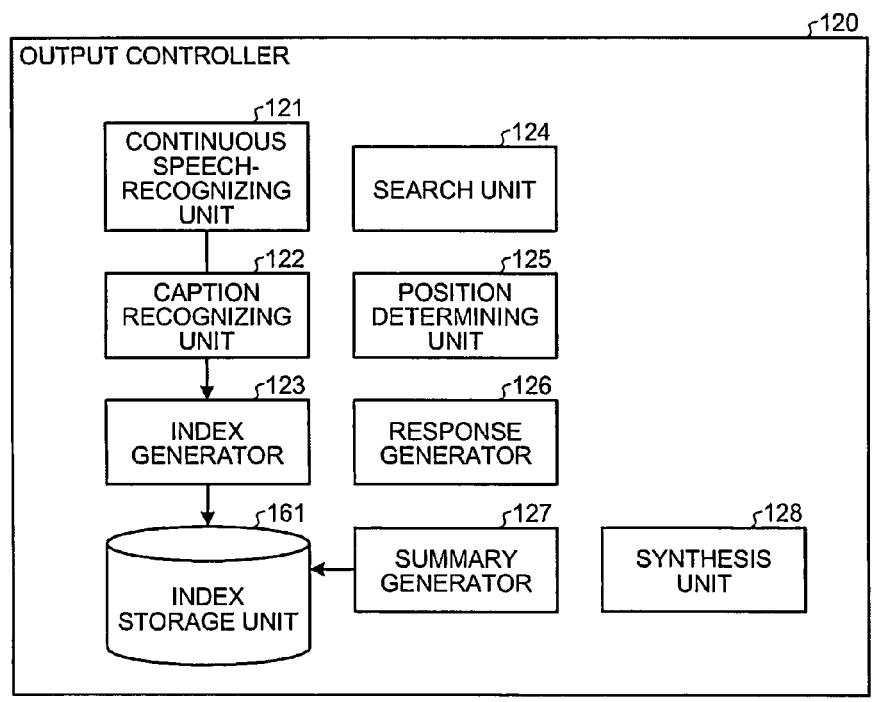
FIG. 10 is a block diagram of a detailed configuration of an output controller.

As shown in FIG. 10, the output controller 120 includes an index storage unit 161, a continuous-speech recognizing unit 121, a caption recognizing unit 122, an index generator 123, a search unit 124, a position determining unit 125, a response generator 126, a summary generator 127, and a synthesis unit 128.

The index storage unit 161 stores indexes generated by the index generator 123. Details of the index will be described later.

The continuous-speech recognizing unit 121 performs a continuous speech-recognition process for obtaining a character string by recognizing speech included in the image contents. The continuous speech-recognition process performed by the continuous-speech recognizing unit 121 can be realized by the conventional art as in the recognizing unit 104.

The caption recognizing unit 122 recognizes a caption included in the image contents as a character to obtain a character string. As the caption recognition process by the caption recognizing unit 122, any method conventionally used, such as a method of using character recognition technique can be employed.

As shown in FIG. 11, the speech recognition result in which reproduction time of the image contents and a result of recognizing speech at that time are associated with each other can be obtained by the continuous-speech recognizing unit 121. Further, a caption recognition result in which the reproduction time and a result of recognizing the caption displayed at that time are associated with each other can be obtained by the caption recognizing unit 122.

The index generator 123 generates an index for storing respective character strings as the recognition results of the continuous-speech recognizing unit 121 and the caption recognizing unit 122 in association with the corresponding time in the images. The generated index is referred by the search unit 124 and the response generator 126.

The index generator 123 extracts proper expression such as person's name, name of a place, company name, cuisine, and quantity included in the input character string, to generate an index so that the character string can be discriminated from other character strings. A proper-expression extraction process performed by the index generator 123 can be realized according to any method conventionally used, such as a method of collating the character string with a proper expression dictionary to extract the proper expression.

Specifically, words as objects of proper expression are stored beforehand in the proper expression dictionary (not shown). The index generator 123 performs morphological analysis relative to an object text as an extraction object, determines whether each word is present in the proper expression dictionary, and extracts the one present as the proper expression. Simultaneously, expression before and after the proper expression is ruled such that "in the case of company name, the expression of "Ltd." or "Limited" appears before or after the proper expression", and when there is a word series to be collated with the rule, the corresponding word can be extracted as the proper expression.

The index generator 123 adds a tag indicating that it is an index to the proper expression, so that the extracted proper expression can be searched. The index represents a semantic attribute of the proper expression, and a value stored beforehand in the proper expression dictionary is added thereto. For example, when "new potato" is extracted as the proper expression, tags "<food>" and "</food>" are added before and after "new potato".

FIG. 12 is a schematic diagram for explaining one example of an index extracted by the index generator 123 from the recognition result shown in FIG. 11 and added. In FIG. 12, an example in which person's name (person), food, and quantity are mainly extracted as the proper expression and designated as the index is shown.

The respective processes performed by the continuous-speech recognizing unit 121, the caption recognizing unit 122, and the index generator 123 are executed, for example, when the broadcasted program is stored (recorded) in the image storage unit 155. It is assumed that the generated index is stored beforehand in the index storage unit 161 when the recorded program is to be reproduced.

When the request extracted by the extracting unit 106 is a query, the search unit 124 refers to the index storage unit 161 to search for the speech recognition result and the caption recognition result associated with the query.

When the request extracted by the extracting unit 106 is requesting rewind, the position determining unit 125 determines a rewind position. Further, when the extracted request is a query, and when the related recognition result is searched by the search unit 124, the position determining unit 125 determines a position to start reproduction for reproducing the image contents corresponding to the searched recognition result.

The response generator 126 generates a response according to the search result of the search unit 124. Specifically, the response generator 126 extracts a text present within a predetermined time before and after the searched text from the index storage unit 161, to generate a result of unifying a style of the searched text with a style of the extracted text and deleting an overlapped portion as a response.

The summary generator 127 generates summary information of the images to be reproduced. As a method of generating the summary, an existing technique for generating a summarized image or a digest image relative to the image contents can be employed. For example, a method of generating a digest by extracting a cut (a point where the image changes abruptly) or a break in the speech to detect a shot (a series of image connection), and selecting an important shot from the shots to generate the digest relative to images in a range of generating the summary can be used.

To select the important shot, a method in which speech in each shot, a closed caption, or the caption is recognized, importance of each text is determined by applying a summarizing method used in text summary, and each shot is ranked according to the importance can be employed.

With regard to a program progressing according to a certain rule such as baseball and soccer, a model-based summarizing method can be employed. The model-based summarizing method is a method in which, for example, in the case of baseball, because events such as "hit" and "strikeout", names of a batter and a pitcher, and scores appear in the image in a form of speech or caption without fail in the program, the speech or caption is recognized by speech recognition or caption recognition to extract information according to a game model, and the summary is generated according to the extracted information.

When an instruction to synthesize and output the speech is included in the determined response action, the synthesis unit 128 generates a speech signal obtained by speech-synthesizing the instructed character string. For a speech synthesis process performed by the synthesis unit 128, any method generally used, such as speech-element-edited speech synthesis, formant speech synthesis, speech synthesis based on speech corpus can be employed.

An interaction process performed by the video recording-reproducing apparatus 100 according to the present embodiment constituted as described above is explained with reference to FIG. 13.

The response determining unit 107 sets the state of the interactive process to an initial state (step S1301). The speech receiver 103 or the request receiver 105 receives a speech input or a character input, respectively (step S1302).

When speech is received, the recognizing unit 104 recognizes the received speech (step S1303). Thus, in the present embodiment, it is assumed that an input of the command and the like is performed by speech or by the remote controller. Upon reception of either input, the interactive process is executed.

The extracting unit 106 determines whether the received speech or character is a command or a query, to execute an input determination process for extracting the command or the query (step S1304). Details of the input determination process will be explained later.

The extracting unit 106 then determines whether the input command has been extracted (step S1305). When it is extracted (YES at step S1305), the response determining unit 107 shifts the state of interactive process to the next state corresponding to the input command (step S1306). Specifically, the response determining unit 107 refers to the state transition table in the state-transition storage unit 153, to obtain the next state corresponding to the current state and the input command, and shifts the state to the obtained next state. For example, when a program list command is input in the initial state, the response determining unit 107 obtains the program-list display state from the state transition table as the next state, and shifts the state to the program-list display state.

The response determining unit 107 then obtains the action name of the shifted state from the state transition table (step S1307). In the above example, the response determining unit 107 obtains program list display as the action name corresponding to the program-list display state.

The watching-degree determining unit 102 executes a watching-degree determination process (step S1308). The watching-degree determination process stands for a process for detecting a viewing direction of the user and a distance to the user by infrared rays and ultrasonic waves emitted from the headset 201, to determine the watching degree based on the detected viewing direction and the distance. Details of the watching-degree determination process will be explained later.

The output controller 120 obtains a response action corresponding to the action name obtained at step S1307 and the watching degree determined at step S1308 from the response correspondence table in the response storage unit 154 (step S1309). In the above example (action name=program list display), if it is assumed that the determined watching degree is "close/facing", "Normal display of ten items" is obtained as the response action.

The output controller 120 then outputs the response according to the obtained response action (step S1310).

For example, when the action name is "program list display", response actions of "Normal display of ten items", "Normal display of ten items and speech output of one item", "Enlarged display of five items", and "Enlarged display of five items and speech output of one item" are respectively described relative to "close/facing", "close/different direction", "far/facing", and "far/different direction", which indicate user's watching degree.

"Normal display" and "enlarged display" express that a character is output to the display unit 136, and the size of the character is enlarged and displayed in the "enlarged display", as compared to the "normal display". FIGS. 14 and 15 are schematic diagrams for explaining one example of the program-list display screen, respectively, in the case of normal display and the enlarged display. In FIG. 14, an example in which a program list of first ten items is displayed in normal characters is shown. In FIG. 15, an example in which a program list of first five items is displayed in enlarged characters is shown.

Further, "speech output of one item" means that information of the first item in the program list is output by speech. For example, when there are 16 programs to be list-displayed, information of the first program title and the number of programs can be output by speech. In this case, the output controller 120 transmits a character string, "Channel 8, Afternoon Information Program from 15:00 on August 10th, and other 15 programs", to the synthesis unit 128, and the synthesis unit 128 generates a digital speech signal. The generated speech signal is output from the speaker 134.

Further, "Rewind up to specified spot and reproduce" means that after rewinding up to the specified spot, reproduction is performed from the spot. "Rewind up to specified spot, reproduce, and speech output of summary" means that after rewinding up to the specified spot, reproduction is performed from the spot, and a summary of the rewound portion is generated and the generated summary is output by speech. Generation of the summary is executed by the summary generator 127.

A method of changing the response content and an output mode includes a method of changing an output medium, for example, displaying the response on the display unit 136 or outputting the response to the speaker 134, and a method of changing the display mode, such as the size, the number of characters, background, and presence of flicker at the time of displaying the characters.

The information amount at the time of generating the summary can be changed. For example, in the case of "far/facing", the image contents to be output as a summary result can be long. However, in the case of "far/different direction", a short summary is generated by narrowing down the point. The length adjustment of the summary result can be performed by controlling to which level of importance is to be left as the summary result, according to the importance at the time of selecting a shot in a summarizing process. Further, a text to be generated can be made short by abbreviating a modifier in the text.

The above response output form is only one example, and processes corresponding to any response that can be executed by the general video recording-reproducing apparatus 100 are executed in a response output process at step S1310.

At step S1305, when it is determined that an input command has not be extracted (NO at step S1305), the extracting unit 106 determines whether a query has been extracted (step S1311). When the query has been extracted (YES at step S1311), the watching-degree determining unit 102 executes the watching-degree determination process (step S1312). The watching-degree determination process is the same as at step S1308 (details thereof are explained later).

The output controller 120 obtains a response action corresponding to the action name and the watching degree determined at step S1312 from the response correspondence table (step S1313). In this case, it is assumed that the action name is "query response output", and a corresponding response action is obtained. Further, the action name can be further refined corresponding to the query content.

The output controller 120 executes a search process for searching for a text associated with the query from the image contents (step S1314). The output controller 120 refers to the search result to execute a response generation process for generating a response to the query (step S1315). Details of the search process and the response generation process will be explained later.

After a response to the query is generated at step S1315, the output controller 120 outputs the generated response to any one of the display unit 136 and the speaker 134 or both (step S1316).

After the response is output at step S1316, and after the response is output at step S1310, or when it is determined that the query has not been extracted at step S1311 (NO at step S1311), control returns to the next request reception process to repeat the process (step S1302).

By performing such a process, the response content and the output mode can be changed according to the watching degree of the user and presented to the user, when the response is output relative to the user's request (command or query) to perform interaction. That is, an appropriate and natural interactive process corresponding to the watching degree of the user can be realized.

Figure 16:
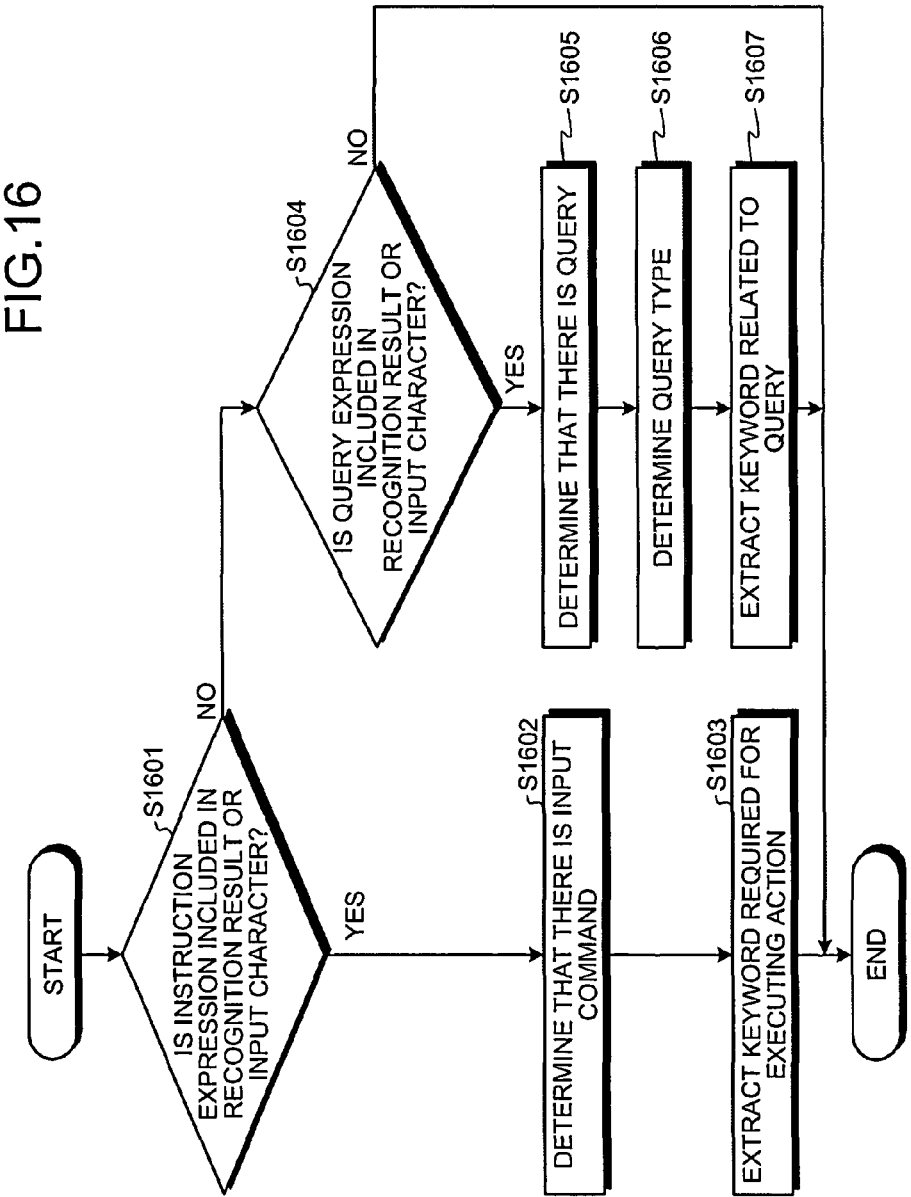
FIG. 16 is a flowchart of an overall flow of an input determination process in the embodiment.

Details of the input determination process at step S1304 is explained with reference to FIG. 16.

At first, the extracting unit 106 determines whether an instruction expression in the instruction expression table is included in the recognition result of the input speech or the input character (step S1601). For example, when the recognition result is "rewind for 30 seconds", and the instruction expression table as shown in FIG. 5 is stored in the instruction-expression storage unit 151, the extracting unit 106 determines that the instruction expression "rewind" is included in the recognition result.

When the instruction expression is included in the recognition result (YES at step S1601), the extracting unit 106 determines that there is an input command (step S1602). The extracting unit 106 determines the input command corresponding to the instruction expression according to the instruction expression table in the instruction-expression storage unit 151 as shown in FIG. 5. For example, the extracting unit 106 determines that the instruction expression "rewind" is a rewind command.

The extracting unit 106 extracts a keyword required for execution of the response action corresponding to the input command from the recognition result or the input character (step S1603). For example, the extracting unit 106 extracts a time expression "30 seconds" as the rewind time from the recognition result of "rewind for 30 seconds". Likewise, the extracting unit 106 extracts a time expression "one minute before" as the rewind time from the recognition result of "reproduce one minute before".

When a recognition result of "rewind until top of 5th inning" is obtained, words "5th" and "top" are extracted as the keywords from the recognition result. In this manner, even when the rewind position is instructed other than by the time expression, the position determining unit 125 can determine the rewind position, by using the extracted keyword.

When it is determined that the instruction expression is not included at step S1601 (NO at step S1601), the extracting unit 106 determines whether a query expression in the query expression table is included in the recognition result or the input character (step S1604).

When the query expression is not included (NO at step S1604), the input determination process is finished. When the query expression is included (YES at step S1604), the extracting unit 106 determines that there is a query (step S1605). The extracting unit 106 determines a query type of the query by referring to the query expression table (step S1606). For example, when a recognition result, "how many grams of sugar should I add?" is obtained, "<quantity>" corresponding to the query expression of "how many grams" in the query expression table is determined as the query type.

The extracting unit 106 then extracts a keyword related to the query from the recognition result or the input character (step S1607). In the above example ("how many grams of sugar should I add?"), the extracting unit extracts words "sugar" and "add" as the keyword.

Likewise, for example, with respect to recognition results of "how is the weather today?", "who is on the show?", or "how should I cut potatoes?", "<how>", today, weather", "<person>, perform", and "<how>, potatoes, cut" are respectively extracted as the keywords.

Figure 17:
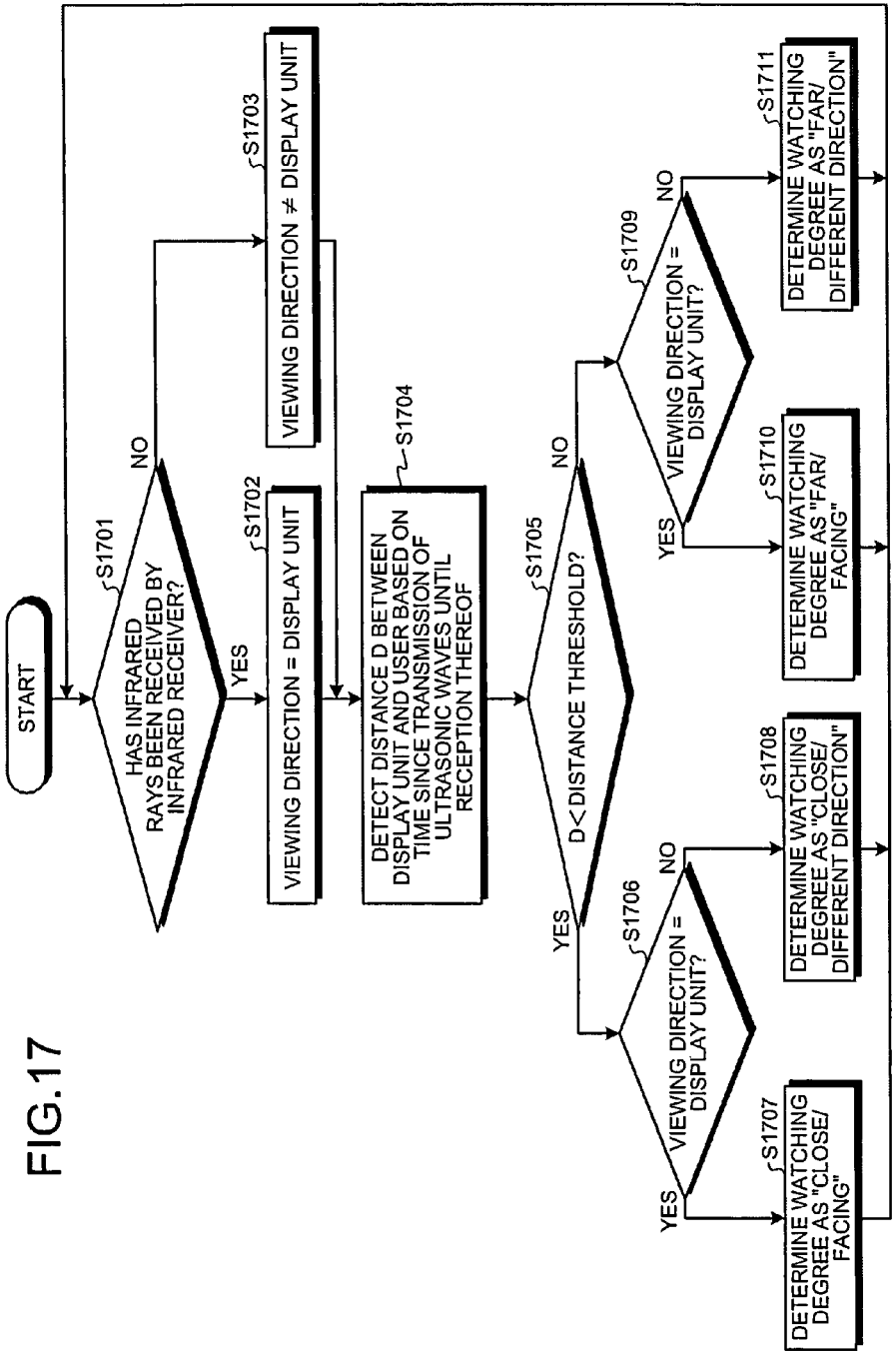
FIG. 17 is a flowchart of an overall flow of a watching-degree determination process in the embodiment.

Details of the watching-degree determination process at steps S1308 and S1312 are explained with reference to FIG. 17.

The direction detector 101a determines whether the infrared receiver 132a has received infrared rays (step S1701). When the infrared rays are received (YES at step S1701), the direction detector 101a determines that the viewing direction of the user faces the display unit 136 (step S1702). When infrared rays are not received (NO at step S1701), the direction detector 101a determines that the viewing direction of the user does not face the display unit 136 (step S1703).

The distance detector 101b then detects the distance between the display unit 136 and the user (hereinafter, "distance D"), based on the time since transmission of ultrasonic waves by the ultrasonic transmitter 131b until reception of ultrasonic waves by the ultrasonic receiver 132b (step S1704).

The watching-degree determining unit 102 determines whether the detected distance D is shorter than a predetermined distance threshold value (step S1705). When the distance D is shorter than the threshold value (YES at step S1705), the watching-degree determining unit 102 further determines whether the detected viewing direction faces the display unit 136 (step S1706).

When the viewing direction faces the display unit 136 (YES at step S1706), the watching-degree determining unit 102 determines the watching degree as "close/facing" (step S1707). When the viewing direction does not face the display unit 136 (NO at step S1706), the watching-degree determining unit 102 determines the watching degree as "close/different direction" (step S1708).

When it is determined that the distance D is not shorter than the distance threshold value (NO at step S1705), the watching-degree determining unit 102 determines whether the viewing direction detected by the direction detector 101 faces the display unit 136 (step S1709).

When the viewing direction faces the display unit 136 (YES at step S1709), the watching-degree determining unit 102 determines the watching degree as "far/facing" (step S1710). When the viewing direction does not face the display unit 136 (NO at step S1709), the watching-degree determining unit 102 determines the watching degree as "far/different direction" (step S1711).

Figure 18:
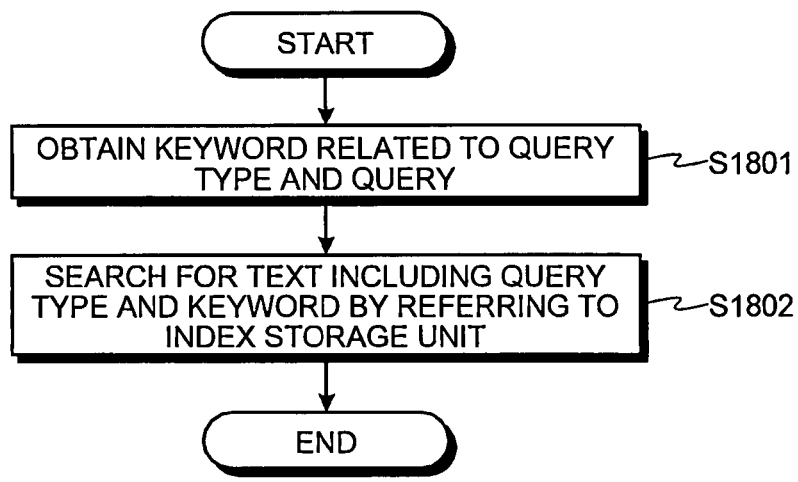
FIG. 18 is a flowchart of an overall flow of a search process in the embodiment.

Details of the search process at step S1314 are explained with reference to FIG. 18.

At first, the search unit 124 obtains a query type of the query extracted in the input determination process at step S1304 and a keyword related to the query (step S1801). The search unit 124 searches the index storage unit 161 for the speech recognition result or the caption recognition result including the obtained query type and keyword from the current time toward the past time (step S1802).

For example, it is assumed that "<how>" is searched as the query type and "potatoes" and "cut" are searched as the keywords from "how should I cut potatoes". In this case, when it is assumed that indexes including the information as shown in FIG. 12 are stored in the index storage unit 161, "First, cut potatoes like this", which is the speech recognition result at time "03:15.041" is searched. The search unit 124 searches the image contents for a text related to the query in this manner.

Figure 19:
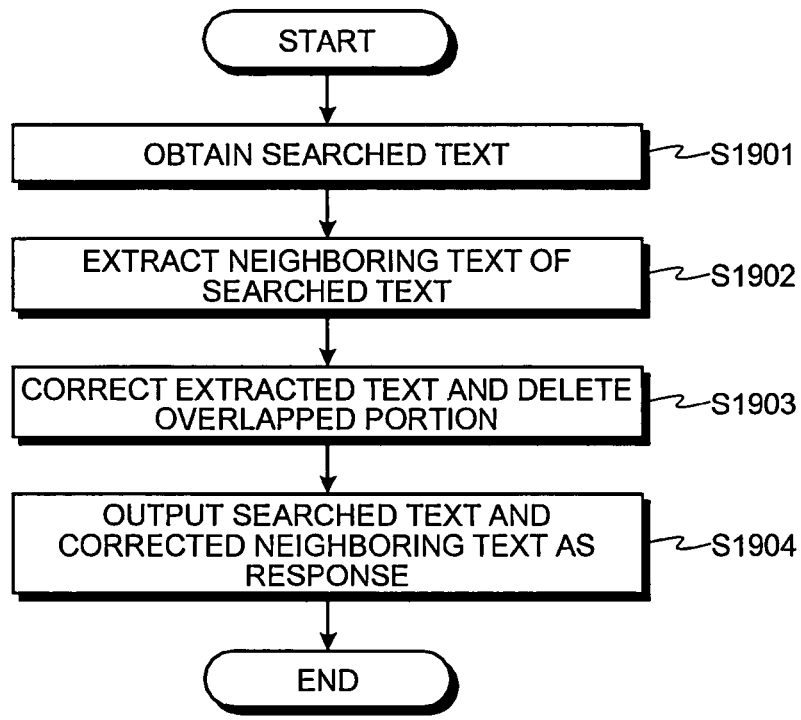
FIG. 19 is a flowchart of an overall flow of a response generation process in the embodiment.

Details of the response generation process at step S1315 are explained with reference to FIG. 19.

First, the response generator 126 obtains the text searched in the search process (step S1901). The response generator 126 then extracts a neighboring text of the searched text (step S1902). The response generator 126 extracts the neighboring text relative to both the speech recognition result and the caption recognition result. As the neighboring text, a text immediately before or after the searched text can be extracted, or a text within a predetermined time before or after the searched text can be extracted.

For example, it is assumed that a text "cut potatoes like this" is searched relative to the query of "how should I cut potatoes". When it is assumed that an extraction target is a text within 5 seconds before or after the searched text, a recognition result of caption, "Cut it into dices", displayed at time "03:16.000" is extracted as the neighboring text, from the indexes shown in FIG. 12.

The response generator 126 then corrects the style of the extracted text or deletes the overlapped portion (step S1903). For example, if the caption is in a literary style, the response generator 126 corrects the sentence in a colloquial style.

Further, for example, it is assumed that a query "how many grams of sugar?" is received, and a speech recognition result, "Add a spoon of sugar" at time "04:20.500" and a caption recognition result, "A spoon of sugar" at time "04:21.000" are extracted. In this case, because the both include overlapped words, the response generator 126 deletes one of the texts, and generates a response as "Add a spoon of sugar".

The response generator 126 outputs the searched text, and the neighboring text of the searched text, corrected at step S1903 as a response (step S1904), to finish the response generation process.

Figure 20:
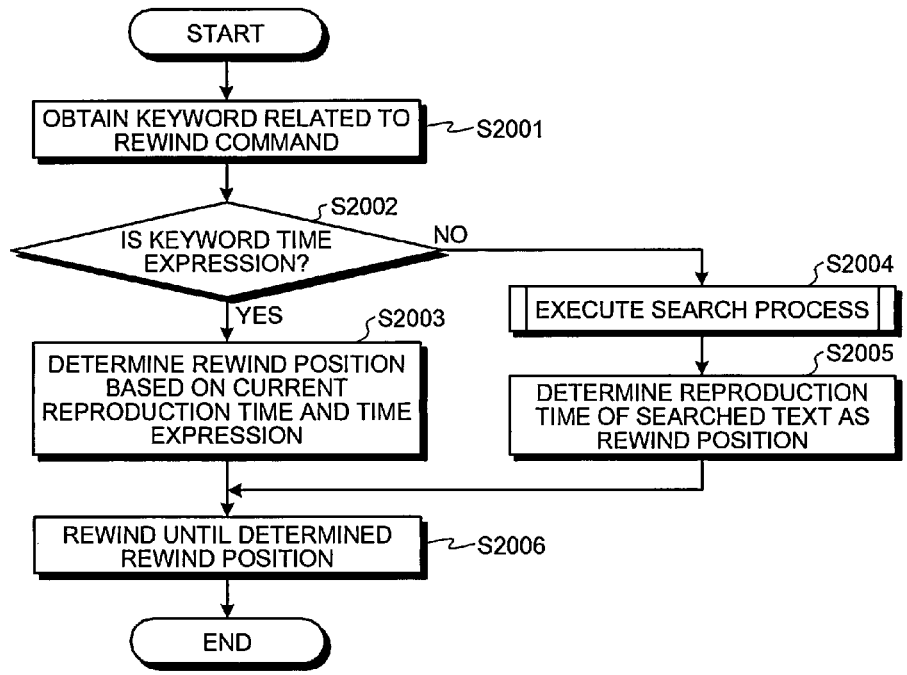
FIG. 20 is a flowchart of an overall flow of a rewinding process in the embodiment.

The rewinding process to be executed upon reception of the rewind command is explained with reference to FIG. 20, as one example of the response action to be executed at step S1310. The rewinding process is executed at step S1310 by receiving the rewind command, or at the time of rewinding to a corresponding position and reproducing the image, when the query is received and an associated text is output as a response. That is, for example, the response output process at step S1316 includes a process for outputting the response generated at step S1315 by speech, as well as a process for rewinding until the time at which the searched text is present and reproducing the image. The rewinding process is executed also in this case.

The position determining unit 125 obtains a keyword related to the rewind command (step S2001). Specifically, the position determining unit 125 obtains the extracted keyword as a keyword required for execution of the response action relative to the input command, in the input determination process (step S1304). In this process, for example, a keyword by time expression such as "30 seconds" and a keyword not by the time expression such as "5th" and "top" can be obtained.

The position determining unit 125 determines whether the keyword is time expression (step S2002). When the keyword is time expression (YES at step S2002), the position determining unit 125 determines the rewinding position based on the current reproduction time and the time expression (step S2003).

When the keyword is not time expression (NO at step S2002), the same search process at step S1314 is executed (step S2004). In this case, a text including a search key is searched from the image contents, using the keyword associated with the rewind command as a search key. The position determining unit 125 determines the reproduction time associated with the text searched in the search process as a rewind position (step S2005).

The position determining unit 125 then performs the rewinding process until the determined rewind position, to finish the rewinding process (step S2006).

In this manner, the interactive apparatus according to the present embodiment can present a response to the user by changing the response output form, according to the watching status determined based on the viewing direction of the user and the distance to the user. For example, when the user watches the display unit, the image contents are displayed upon reception of an instruction or a query by speech. However, when the user does not watch the display unit, a summary is output by speech, and when the user is away from the display unit, the displayed characters can be enlarged. Accordingly, the response can be changed according to the watching status of the user, to realize natural interaction.

The multimodal interactive apparatus realized as the video recording-reproducing apparatus using the television and a video recorder has been explained above. However, the present invention is also applicable to multimodal interactive apparatuses in other modes. For example, the multimodal interactive apparatus can be applied to a game machine, which can be operated at a position away from the screen, to realize a game machine that changes a response relative to an operation according to whether the user watches the screen or whether the distance to the user is far. When a multimodal interacting unit is used in a central information control system in a plant system or a traffic control system, the method in the present embodiment can be applied.

Figure 21:
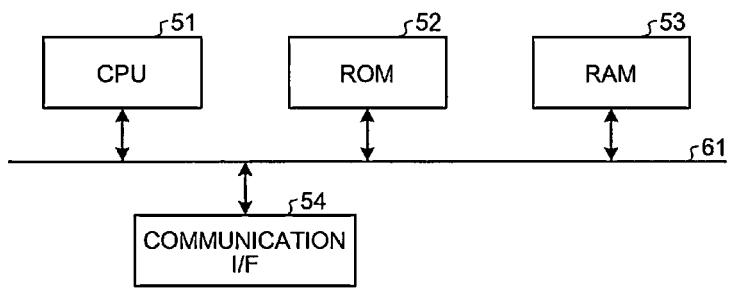
FIG. 21 is a schematic diagram for explaining a hardware configuration of an interactive apparatus according to the embodiment.

A hardware configuration of the interactive apparatus according to the present invention is explained with reference to FIG. 21.

The interactive apparatus according to the present embodiment includes a controller such as a central processing unit (CPU) 51, a storage unit such as a read only memory (ROM) 52 and a random access memory (RAM) 53, a communication I/F 54 that performs communication by connecting to a network, and a bus 61 that connects these units.

An interaction program executed by the interactive apparatus according to the present embodiment is incorporated in the ROM 52 or the like beforehand and provided.

The interaction program executed by the interactive apparatus according to the embodiment can be provided by being recorded on a computer-readable recording medium such as a compact-disk read only memory (CD-ROM), a flexible disk (FD), a compact disk recordable (CD-R), and a digital versatile disk (DVD), in an installable format file or an executable format file.

The interaction program executed by the interactive apparatus according to the embodiment can be stored in a computer connected to a network such as the Internet, and can be downloaded via the network. The interaction program executed by the interactive apparatus according to the embodiment can be provided or distributed via the network such as the Internet.

The interactive program executed by the interactive apparatus according to the embodiment has a module configuration including the respective units (the direction detector, the distance detector, the watching-degree determining unit, the speech receiver, the recognizing unit, the request receiver, the extracting unit, the response determining unit, and the output controller). As the actual hardware, the CPU 51 reads the interactive program from the ROM 52 and executes the program, thereby loading the respective units on a main memory, so that the respective units are generated on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interactive apparatus comprising:
 a recognizing unit configured to recognize speech uttered by a user;
 an extracting unit configured to extract a request from the speech;
 a response determining unit configured to determine a response to the request on the basis of the request;
 a display unit configured to display the response;
 a speech output unit configured to output the response by speech;
 an output controller configured to output the response to at least one of the speech output unit and the display unit;
 a response storage unit configured to store a response correspondence table that contains the response, a watching degree representing a degree that the user watches the display unit, and an output form of the response to at least one of the speech output unit and the display unit;
 a transmitter configured to be mounted on the user and to transmit sensing information transmitted by electromagnetic waves for detecting a viewing direction of the user;
 a receiver configured to receive the sensing information from the transmitter;
 a direction detector configured to detect a viewing direction of the user based on the sensing information; and
 a watching-degree determining unit configured to determine the watching degree on the basis of the viewing direction; wherein
 the output controller obtains the output form corresponding to the response determined by the response determining unit and the watching degree determined by the watching-degree determining unit from the response correspondence table, and outputs the response according to the obtained output form.

2. The apparatus according to claim 1, further comprising a distance detector configured to detect a distance between the user and the display unit, wherein
 the watching-degree determining unit determines the watching degree based on the distance.

3. The apparatus according to claim 2, wherein the watching-degree determining unit determines a higher watching degree when the distance is shorter than a predetermined first threshold value, than the watching degree when the distance is longer than the first threshold value.

4. The apparatus according to claim 1, wherein the response storage unit stores the response correspondence table that contains the response, the watching degree, and the output form for outputting information to be output and summary information obtained by summarizing the information as the response, and
 the output controller generates the summary information from the information and outputs the generated summary information and the information as the response.

5. The apparatus according to claim 4, wherein the response storage unit stores the response correspondence table that contains the response, the watching degree, and the output form for displaying the information on the display unit and for outputting the summary information to the speech output unit, and the output controller synthesizes the summary information in speech, outputs the synthesized speech to the speech output unit, and displays the information on the display unit.

6. The apparatus according to claim 1, wherein the direction detector detects whether the viewing direction faces the display unit based on the sensing information, and the watching-degree determining unit determines a higher watching degree when the viewing direction faces the display unit, than the watching degree when the viewing direction does not face the display unit.

7. The apparatus according to claim 1, wherein the response storage unit stores the response correspondence table that contains the response, the watching degree, and a display mode of the response including a size and a color to be displayed on the display unit as the output form, and the output controller displays the response on the display unit in the obtained display mode.

8. The apparatus according to claim 1, wherein the output controller synthesizes the response in speech and outputs the synthesized speech to the speech output unit, when the output form for outputting the response to the speech output unit is obtained.

9. The apparatus according to claim 1, further comprising a request receiver configured to receive an input of the request, wherein the response determining unit determines the response based on the received request.

10. A method for interacting with a user comprising:
recognizing speech uttered by a user;
extracting a request from the speech;
determining a response to the request on the basis of the request;
receiving a sensing information transmitted by the electromagnetic waves from a transmitter configured to be mounted on the user;
detecting a viewing direction of the user based on the sensing information received from the transmitter;
determining a watching degree representing a degree that the user watches a display unit capable of displaying the response to the request, on the basis of the viewing direction;
obtaining the output form corresponding to the determined response and the determined watching degree from a response correspondence table stored in a response storage unit, the response correspondence table containing the response, the watching degree, and an output form of the response to at least one of a speech output unit capable of outputting the response in speech and the display unit; and
outputting the response to at least one of the speech output unit and the display unit according to the obtained output form.

11. A computer program product having a non-transitory computer readable medium including programmed instructions for interacting with a user, wherein the instructions, when executed by a computer, cause the computer to perform:
recognizing speech uttered by a user;
extracting a request from the speech;
determining a response to the request on the basis of the request;
receiving a sensing information transmitted by electromagnetic waves from a transmitter configured to be mounted on the user;
detecting a viewing direction of the user based on the sensing information received from the transmitter;
determining a watching degree representing a degree that the user watches a display unit capable of displaying the response to the request, on the basis of the viewing direction;
obtaining the output form corresponding to the determined response and the determined watching degree from a response correspondence table stored in a response storage unit, the response correspondence table containing the response, the watching degree, and an output form of the response to at least one of a speech output unit capable of outputting the response in speech and the display unit; and
outputting the response to at least one of the speech output unit and the display unit according to the obtained output form.

12. The interactive apparatus according to claim 1, wherein the electromagnetic waves include infrared waves.

13. The method according to claim 10, wherein the electromagnetic waves include infrared waves.

14. The computer program product according to claim 11, wherein the electromagnetic waves include infrared waves.

* * * * *